(No Model.) 2 Sheets—Sheet 1.
A. PERKINS.
BICYCLE PEDAL.
No. 530,899. Patented Dec. 11, 1894.
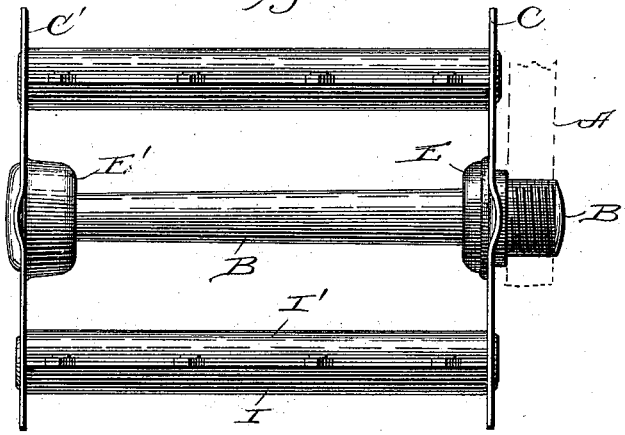
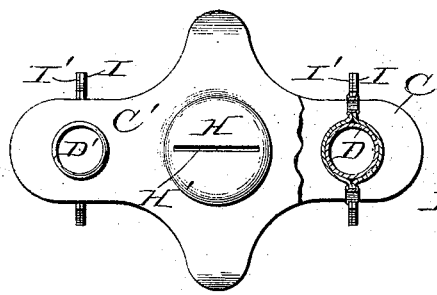
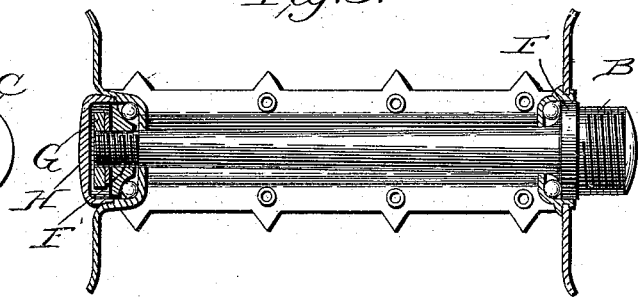
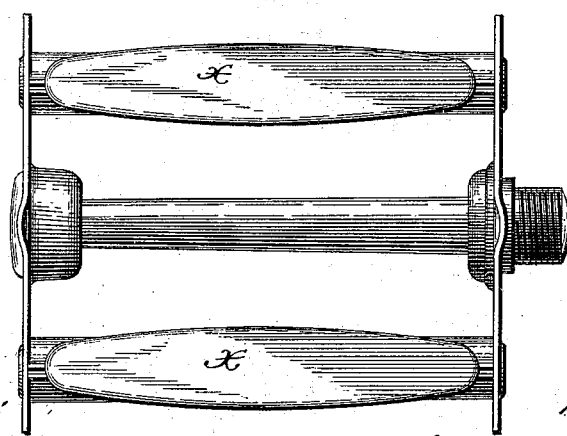
Witnesses:
Harry T. Rohrer
Herbert Bradley
Inventor:
Albert Perkins
By Stiles & Queue
Attys.

(No Model.) 2 Sheets—Sheet 2.

A. PERKINS.
BICYCLE PEDAL.

No. 530,899. Patented Dec. 11, 1894.

Witnesses:
Harry S. Rohrer.
Herbert Bradley.

Inventor:
Albert Perkins
By Philo H. Greene,
Attys.

UNITED STATES PATENT OFFICE.

ALBERT PERKINS, OF CHICOPEE FALLS, MASSACHUSETTS, ASSIGNOR TO THE LAMB MANUFACTURING COMPANY, OF SAME PLACE.

BICYCLE-PEDAL.

SPECIFICATION forming part of Letters Patent No. 530,899, dated December 11, 1894.

Application filed September 14, 1894. Serial No. 523,031. (No model.)

*To all whom it may concern:*

Be it known that I, ALBERT PERKINS, a citizen of the United States, residing at Chicopee Falls, in the county of Hampden, State of Massachusetts, have invented certain new and useful Improvements in Bicycle-Pedals, of which the following is a specification.

The object of this invention is to provide a pedal that shall be of the usual end plate and side-bar form, that shall be extremely light and yet unusually rigid, that shall have less than the usual projection from the crank, that shall readily lend itself to rat-trap, to rubber, or to combination forms, and that shall possess certain minor advantages which will hereinafter appear.

In all its forms, the pedal has two parallel end plates provided with central bearings for an axle and rigidly united to each other by large tubular side bars which are practically one with the end bars which they join. The tubular side bars are inclosed by sleeves made up of sections of sheet steel resting centrally against the tubes and having their lateral margins bent sharply outward to form, when riveted together, double radial flanges or webs extending the whole length of the sleeve. The flanges are provided with teeth at their margins or with rubber or the like held between the flanges of a riveted pair, or with both teeth and rubber, if desired.

Figure 5:
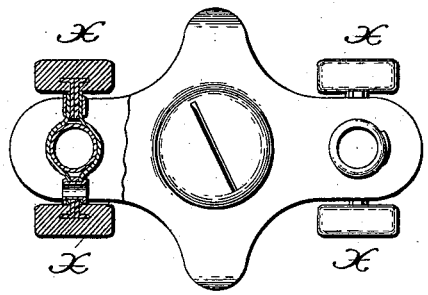
Figure 6:
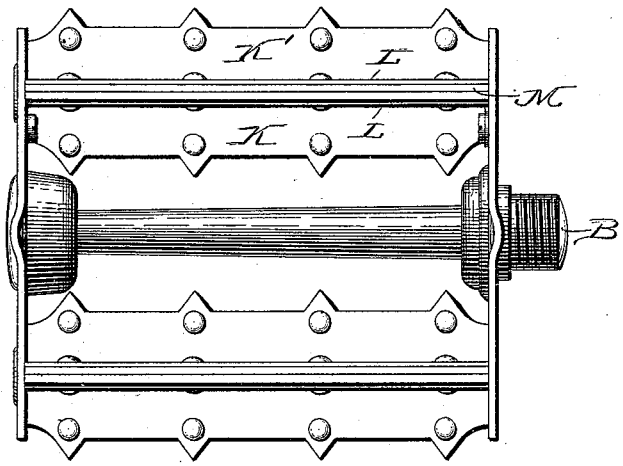
Figure 7:
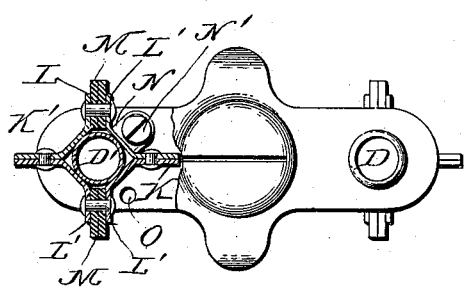
Figure 8:
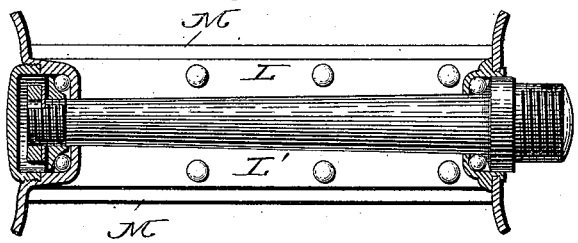

In the drawings, Figures 1, 2, and 3, are, respectively, a plan of the pedal, an end view partly in section, and an axial section all showing the simplest or rat-trap construction. Figs. 4 and 5, show in like plan and end view an analagous pedal without teeth but provided with pads of rubber or the like to receive the pressure of the foot. Figs. 6, 7, and 8, are views similar to Figs. 1, 2, and 3, showing a combination of rat-trap and rubber constructions, forming a pedal that may be used as a rat trap pedal, a rubber pedal, or a pedal having on one side of the axle rubber and upon the other side teeth, so that the foot rests upon a rubber pad and at a short distance therefrom upon a line of teeth also.

In Figs. 1, 2, and 3, A is a crank and B a pedal axle screwed directly into the same in-
stead of projecting through it and having upon its end a securing nut.

C, C' are pedal end plates and D, D' are large tubes forming side bars in the usual location but forming practically one piece with the end plates since they are rigidly and permanently joined with them, preferably by slightly diminishing their ends, thrusting them through the end plates and swaging them, or spinning them down upon the surrounding surface and securing them against rotation by brazing or other additional means. The end plates are provided with ball races, E, E', and the axle has suitable cones F, F' and a lock-nut G, the latter upon the extreme end of the axle and yet somewhat within the plane of the outer end plate. The latter is bent inward about this nut and the interior of the short tube thus formed is screw threaded to receive an externally threaded cap H which screws down close to the axle end and serves to exclude dust and to prevent the escape of oil. The cap is diametrically slotted at H', but not cut through, so that although it does not project so as to be grasped, it may still be readily turned by the use of a screwdriver.

The tubes D, D' are inclosed by sleeves formed from steel plates I, I', provided with teeth along their lateral margins which are bent outward and riveted together to form compound radial flanges diametrically opposite each other and in a plane perpendicular to the plane of the pedal. The sleeves are prevented from rotating by the force of compression which the rivets exert upon the tube, and may be further secured by end lips projecting slightly into the end plates. Now since the tubes D, D' are large, the end plates are rigidly held along two curved lines extending well across them and consequently though thin they are not liable to be twisted. The side bars themselves are very stiff in proportion to weight, and the ribbed sleeve contributes materially to the same result. It follows that the pedal frame is extremely rigid, and that the ball races are at all times held in perfect alignment.

If a rat-trap pedal is not desired, only slight change in construction is necessary. As shown in Figs. 4, and 5, rubber pads of suitable form may be inserted between the margins of the sleeve sections before the latter are riveted together, the construction in other respects remaining unchanged, except that if desired the teeth may be omitted. If still greater stiffness is desired, the sleeves may be made up of four sections, as in Figs. 6, 7, and 8,—in which figures however some additional features are shown. The sleeves being composed of four sections, of equal width, there are four compound radial webs instead of two, and these are at ninety degrees distance from each other. Two diametrically opposite ones, K, K', are toothed precisely as before, and the remaining two, L, L', also diametrically opposite, have, preferably, no teeth but instead have riveted between the parts strips M of rubber which project and afford a bearing for the foot. If the sleeve sections be not curved to fit the tubes which they inclose, there will still be four equidistant lines of contact and the sleeve although internally polygonal will have practically sufficient bearing for mutual support and at the same time little frictional contact. In any case, it has at each end an ear N and a screw N', by which it is secured to the end plates, or is provided with other devices to prevent its free rotation upon the tubes. If the ear and screw are used, additional holes O are provided, at ninety degrees distance, so that the sleeve may be fixed with either the teeth or the rubber in position to meet the foot. Evidently if the teeth of both side bars are uppermost, the pedal acts as a rat-trap pedal. If the rubber pads are uppermost, it acts as a rubber pedal; while if one toothed web and one rubber pad be uppermost, it offers a combination of the two,—an idea that finds favor with some riders.

Tubular rivets are preferred for riveting the webs or flanges but obviously screws might be employed.

What I claim is—

1. The combination with a pedal frame consisting of the end plates and the large tubular side bars forming therewith a practically one-piece frame, of the sidebar-inclosing sleeve made up of sheet steel sections having their margins bent outward in radial planes and united by rivets to form the treads of the pedal.

2. The combination with the practically one-piece frame composed of the end plates and the tubular side bars, of the sleeve sections inclosing said sidebars and having their marginal portions bent outward, elastic pads placed between the members of opposite pairs of said portions, and rivets uniting said members and binding the pad in place to receive the pressure of the foot.

3. The combination with the rigid frame made up of end plates and tubular sidebars, of revoluble sleeves inclosing the sidebars, respectively, and made up of sections having their lateral margins bent outward and riveted together, to form the foot plate of the pedal and means for locking the sleeves, when in different positions, against rotation upon the tubes.

ALBERT PERKINS.

Witnesses:
  CHAS. C. CANDY,
  WARREN S. M. MEAD.